US006952150B2

United States Patent
Radosavljevic et al.

(10) Patent No.: US 6,952,150 B2
(45) Date of Patent: Oct. 4, 2005

(54) PROTECTIVE DEVICE WITH END OF LIFE INDICATOR

(75) Inventors: Dejan Radosavljevic, La Fayette, NY (US); Thomas Packard, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 30 days.

(21) Appl. No.: 10/729,396

(22) Filed: Dec. 5, 2003

(65) Prior Publication Data

US 2004/0264077 A1 Dec. 30, 2004

Related U.S. Application Data

(63) Continuation-in-part of application No. 10/263,028, filed on Oct. 2, 2002.

(51) Int. Cl.[7] .............................................. H01H 73/00
(52) U.S. Cl. ............................ 335/18; 340/653; 361/42
(58) Field of Search ................................. 340/506, 635, 340/638–639, 653; 361/42–51; 335/18; 324/415, 546, 422–424

(56) References Cited

U.S. PATENT DOCUMENTS

| | | | |
|---|---|---|---|
| 5,083,114 A | | 1/1992 | Nakashima et al. |
| 5,600,524 A | | 2/1997 | Neiger et al. |
| 5,715,125 A | | 2/1998 | Neiger et al. |
| 5,956,218 A | | 9/1999 | Berthold |
| 6,052,265 A | * | 4/2000 | Zaretsky et al. ............... 361/42 |
| 6,111,733 A | | 8/2000 | Neiger et al. |
| 6,266,219 B1 | * | 7/2001 | Macbeth et al. ............... 361/42 |
| 6,437,700 B1 | | 8/2002 | Herzfeld et al. |
| 6,472,882 B1 | | 10/2002 | Tiemann et al. |
| 2003/0020619 A1 | * | 1/2003 | Winters et al. ............. 340/632 |

* cited by examiner

Primary Examiner—Lincoln Donovan
(74) Attorney, Agent, or Firm—Daniel P. Malley; Bond, Schoeneck & King, PLLC

(57) ABSTRACT

The present invention is directed to a protective device that includes a plurality of line terminals configured to be connected to an electrical distribution system, and a plurality of load terminals configured to be connected to a load. The device includes a fault detection circuit coupled to the plurality of line terminals and the plurality of load terminals. The fault detection circuit is configured to detect at least one fault in the electrical distribution system. A power interruption circuit couples the plurality of line terminals to the plurality of load terminals to thereby provide power to the load under normal operating conditions. The power interruption circuit also is coupled to the fault detection circuit, and configured to decouple the plurality of line terminals from the plurality of load terminals in response to the fault detection circuit detecting the at least one fault. A test circuit is coupled to the fault detection circuit and the power interruption circuit. The test circuit is configured to provide a simulated fault signal to the fault detection circuit in response to a user stimulus. An end-of-life indication circuit is coupled to the test circuit and the power interruption circuit. The end-of-life indication circuit provides the user with an end-of-life alarm indicator if the fault detection circuit fails to respond to the simulated fault signal within a predetermined period of time.

44 Claims, 12 Drawing Sheets

PROTECTIVE DEVICE WITH END OF LIFE INDICATOR

CROSS-REFERENCE TO RELATED APPLICATIONS

This is a continuation-in-part of U.S. patent application Ser. No. 10/263,028 filed Oct. 2, 2002, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to devices for protecting electrical circuits, and particularly to devices for protecting electrical circuits having test indicators.

2. Technical Background

An electrical distribution system typically includes a circuit breaker, branch circuit conductors connected to the circuit breaker, and wiring devices connected to the circuit conductors. Wiring devices include receptacles, switches, and other such devices. Each wiring device includes line contacts that couple the device to the source of electrical power, and load contacts that provide power to a load, such as an appliance or a switch. Protective devices are employed in the electrical distribution system to protect a circuit from hazards that occur due to electrical faults. There are several types of protective devices, one type is commonly known as a ground fault circuit interrupter (GFCI), and the other is known as an arc fault circuit interrupter (AFCI).

As the name suggests, a GFCI includes interrupting contacts that disconnect the line contacts from the load, when a ground fault is detected. For example, most GFCIs will sense a fault when the line (e.g., the "hot" electrical lead) is shorted to ground. In the absence of a GFCI, a life threatening electric shock hazard may be present.

An arc fault is a high power discharge of electricity between two or more conductors, such as the line conductor and the neutral conductor. An AFCI also includes interrupting contacts that are configured to disconnect the line contacts from the load when an arc fault is detected. There are two types of arc faults. One type is a parallel arc fault, and the other is known as a series arc fault. A parallel arc fault may be caused by damaged insulation, such as from an overdriven staple. The current through this type of fault is not limited by the impedance of the appliance (load), but rather by the available current of the source voltage. The available current is established by the impedance of the conductors and terminals between the source of line voltage and the position of the fault, thus effectively across the line. A series arc fault may be caused by a break in the line or neutral conductors of the electrical distribution system, or may be at a loose terminal at a wiring device within the system. The current through this type of fault is limited by the impedance of the load. Since the fault is in series with the load, this type of fault is referred to as a "series arc fault." In the absence of an AFCI, the current generated by the arc fault may ignite combustible materials and result in fire.

As noted above, protective devices include a circuit interrupter, or interrupting contacts, that disconnect the load terminals from the line terminals when a fault is detected. Thus, the protective device is provided with a sensor for sensing the fault, and a detector for establishing if the sensed signal represents a true hazardous fault, as opposed to a false positive caused by electrical noise. The detector drives a switch that actuates the circuit interrupter. The circuit interrupter typically includes a relay or trip mechanism that is operated by a solenoid responsive to the switch. A power supply may be required to furnish power to the sensor, detector, switch or solenoid. The power supply may derive power from the electrical distribution system through either the line terminals or load terminals.

The protective device includes electronic and mechanical components that may fail. Component failure may occur for a variety of reasons. For example, failure may occur because of the normal aging of electronic components. Mechanical parts may become corroded, or experience mechanical wear. Devices may fail because of mechanical abuse, or because they are overloaded when installed. Electrical power surges, such as from lightning, also may result in failure. The sensor, the detector, the switch, trip mechanism, and/or power supply may fail. As a result, the circuit interrupter may not function to remove power from the load during a fault condition.

In one approach that has been considered, protective devices are often equipped with a test button to determine the operating condition of the device. The test button may be actuated periodically to determine the condition of the device. The test result may be indicated is a variety of ways. For example, the test result indicator may be a button that is configured to pop out of the device, the test indicator may be a visual display, such as a lamp or a mechanical flag, or the test indicator may be an audible sound generated by an annunciator. Unfortunately, the above approach does not provide the user with any indication that the device is at the end of its useful life. Thus, what is needed is a protective device that includes an end-of-life indicator. It would be beneficial to provide an end-of-life indicator that is enabled when the trip mechanism fails to cause the circuit interrupter to remove power from the load side within a predetermined time interval.

SUMMARY OF THE INVENTION

The present invention addresses the aforementioned needs by providing a protective device that includes an end-of-life indicator. The end-of-life indicator of the present invention is enabled when the trip mechanism fails to cause the circuit interrupter to remove power from the load side within a predetermined time interval after a test has been conducted. The present invention thus provides a user with an end-of-life alarm that communicates to the user that one or more components in the device have reached the end of their operational life.

One aspect of the present invention is a protective device that includes a plurality of line terminals configured to be connected to an electrical distribution system, and a plurality of load terminals configured to be connected to a load. The device includes a fault detection circuit coupled to the plurality of line terminals and the plurality of load terminals. The fault detection circuit is configured to detect at least one fault in the electrical distribution system. A power interruption circuit couples the plurality of line terminals to the plurality of load terminals to thereby provide power to the load under normal operating conditions. The power interruption circuit also is coupled to the fault detection circuit, and configured to decouple the plurality of line terminals from the plurality of load terminals in response to the fault detection circuit detecting the at least one fault. A test circuit is coupled to the fault detection circuit and the power interruption circuit. The test circuit is configured to provide a simulated fault signal to the fault detection circuit in response to a user stimulus. An end-of-life indication circuit is coupled to the test circuit and the power interruption circuit. The end-of-life indication circuit provides the user with an end-of-life alarm indicator if the fault detection circuit fails to respond to the simulated fault signal within a predetermined period of time.

In another aspect, the present invention includes a protective device that includes a plurality of line terminals configured to be connected to an electrical distribution system, and a plurality of load terminals configured to be connected to a load. The device includes a fault detection circuit coupled to the plurality of line terminals and the plurality of load terminals. The fault detection circuit is configured to detect at least one fault in the electrical distribution system. A power interruption circuit couples the plurality of line terminals to the plurality of load terminals to thereby provide power to the load under normal operating conditions. The power interruption circuit also is coupled to the fault detection circuit, and configured to decouple the plurality of line terminals from the plurality of load terminals in response to the fault detection circuit detecting the at least one fault. A test circuit is coupled to the fault detection circuit and the power interruption circuit. The test circuit is configured to provide a simulated fault signal to the fault detection circuit in response to a user stimulus. An end-of-life indication circuit is coupled to the test circuit and the power interruption circuit. The end-of-life indication circuit provides the user with an end-of-life alarm indicator if the fault detection circuit fails to respond to the simulated fault signal within a predetermined period of time. A resettable latch is configured to be latched by the simulated fault signal and unlatched by the power interruption circuit, the end-of-life indication circuit providing the user with the end-of-life alarm indicator if the fault detection circuit fails to actuate the power interruption circuit in response to the simulated fault signal.

In yet another aspect, the present invention is directed to a protective device that includes a plurality of line terminals configured to be connected to an electrical distribution system, and a plurality of load terminals configured to be connected to a load. The device includes a fault detection circuit coupled to the plurality of line terminals and the plurality of load terminals. The fault detection circuit is configured to detect at least one fault in the electrical distribution system. A power interruption circuit couples the plurality of line terminals to the plurality of load terminals to thereby provide power to the load under normal operating conditions. The power interruption circuit also is coupled to the fault detection circuit, and configured to decouple the plurality of line terminals from the plurality of load terminals in response to the fault detection circuit detecting the at least one fault. A test circuit is coupled to the fault detection circuit and the power interruption circuit. The test circuit is configured to provide a simulated fault signal to the fault detection circuit in response to a user stimulus. An end-of-life indication circuit is coupled to the test circuit and the power interruption circuit. The end-of-life indication circuit provides the user with an end-of-life alarm indicator if the fault detection circuit fails to respond to the simulated fault signal within a predetermined period of time. A non-resettable latch is configured to be latched by the simulated fault signal to thereby enable the end-of-life indication circuit and provide the end-of-life alarm indicator, the non-resettable latch permanently enabling the end-of-life indication circuit if the fault detection circuit fails to actuate the power interruption circuit in response to the simulated fault signal within a predetermined time interval.

In yet another aspect, the present invention is directed to a protective device that includes a plurality of line terminals configured to be connected to an electrical distribution system, and a plurality of load terminals configured to be connected to a load. The device includes a fault detection circuit coupled to the plurality of line terminals and the plurality of load terminals. The fault detection circuit is configured to detect at least one fault in the electrical distribution system. A power interruption circuit couples the plurality of line terminals to the plurality of load terminals to thereby provide power to the load under normal operating conditions. The power interruption circuit also is coupled to the fault detection circuit, and configured to decouple the plurality of line terminals from the plurality of load terminals in response to the fault detection circuit detecting the at least one fault. A test circuit is coupled to the fault detection circuit and the power interruption circuit. The test circuit is configured to provide a simulated fault signal to the fault detection circuit in response to a user stimulus. An end-of-life indication circuit is coupled to the test circuit and the power interruption circuit. The end-of-life indication circuit provides the user with an end-of-life alarm indicator if the fault detection circuit fails to respond to the simulated fault signal within a predetermined period of time.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
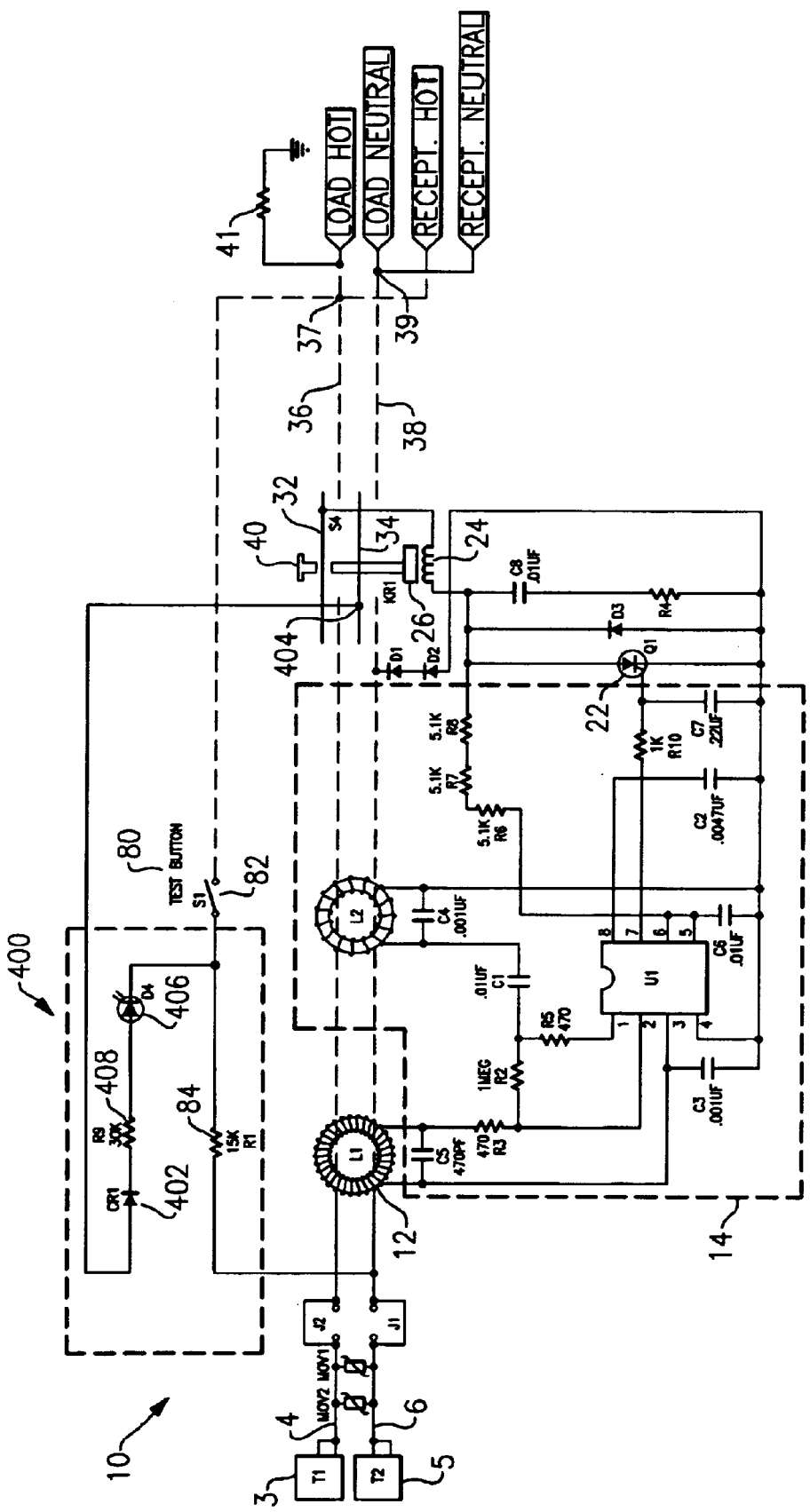
FIG. 1 is a schematic of a GFCI device according to a first embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective device of the present invention is shown in FIG. 1, and is designated generally throughout by reference numeral 10.

In accordance with the invention, the present invention is directed to a protective device that includes a plurality of line terminals configured to be connected to an electrical distribution system, and a plurality of load terminals configured to be connected to a load. The device includes a fault detection circuit coupled to the plurality of line terminals and the plurality of load terminals. The fault detection circuit is configured to detect at least one fault in the electrical distribution system. A power interruption circuit couples the plurality of line terminals to the plurality of load terminals to thereby provide power to the load under normal operating conditions. The power interruption circuit also is coupled to the fault detection circuit, and configured to decouple the plurality of line terminals from the plurality of load terminals in response to the fault detection circuit detecting the at least one fault. A test circuit is coupled to the fault detection circuit and the power interruption circuit. The test circuit is configured to provide a simulated fault signal to the fault detection circuit in response to a user stimulus. An end-of-life indication circuit is coupled to the test circuit and the power interruption circuit. The end-of-life indication circuit provides the user with an end-of-life alarm indicator if the fault detection circuit fails to respond to the simulated fault signal within a predetermined period of time.

Thus, the present invention provides a user with an end-of-life alarm that communicates to the user that one or more components in the device have reached the end of their operational life.

As embodied herein, and depicted in FIG. 1, GFCI 10 includes line terminals 3 and 5 that are coupled to a line conductor and neutral conductor of the electrical distribution system, respectively. Thus, terminals 3 and 5 are configured to provide device 10 with power from the electrical distribution system. Device 10 also includes load terminals 37 and 39 which are configured to provide electrical power to a load. Obviously, load terminals 37 and 39 may be adapted for use in a circuit breaker, receptacle, plug module, or in any suitable wiring device.

A discussion of the operation of GFCI 10 is as follows. A ground fault is represented by "resistor" 41. A ground fault produces an additional current in conductor 4 that is not present in conductor 6. Sensor 12 senses the differential current between conductors 4 and 6. The differential current is detected by a ground fault detector 14. If the difference current between conductors 4 and 6 exceeds a predetermined threshold, typically 6 milliamperes, detector 14 issues a trip command to an SCR 22. SCR 22 activates solenoid 24. Solenoid 24 actuates trip mechanism 26, which releases contact armatures 34 and 32. As a result, the circuit from a line hot terminal 3 to load hot terminal 37, and from line neutral terminal 5 to load neutral terminal 39 is broken.

GFCI 10 also includes a test circuit 80. Test circuit 80 includes test contact 82 and resistor 84. When contact 82 is depressed, a difference current flows through resistor 84 for a predetermined time interval. The time interval is measured from the time contact 82 is depressed, to the time contact armatures 34 and 32 are released. The time interval is nominally 25 milliseconds. The additional current on conductor 4 is sensed by sensor 12, detected by detector 14, and SCR 22 and solenoid 24 are actuated to cause device 10 to trip in the manner described above. For 120 Volt electrical distribution systems, the value of test resistance in the test circuit is defined by UL. In particular, resistor 84 is required to be 15KΩ. After the test is complete, device 10 is reset by pressing a reset button 40, which mechanically resets trip mechanism 26.

GFCI 10 also includes end-of-life indication circuit 400. In this embodiment, indication circuit 400 includes diode 402, resistor 408, and end-of-life indicator 406. Resistor 408 and end-of-life indicator 406 are coupled in series with contact 82. Diode 402 may be included if necessary to protect end of life indicator 406 from reverse bias. The other end of resistor 408 or diode 402 is coupled to node 404 on armature 34, or to conductor 38. End-of-life indication circuit 400 is configured to conduct little, or preferably no, difference current between conductors 4 and 6. Thus, the current through resistor 408 does not violate the UL test simulation signal requirement discussed above.

When device 10 is in good order, e.g., before the end of its operational life, current flows through resistor 84 and end of life indicator 406 during the predetermined time interval described above. Thus, under normal conditions, when test contact 82 is depressed, current flows through end-of-life indicator 406 for approximately 25 milliseconds.

However, the components in device 10 can fail such that the trip time after contact 82 is manually depressed is greater than the predetermined time interval described above, or device 10 can fail to trip altogether. Examples of failure modes include a defective sensor 12. When sensor 12 is a transformer, it may develop open or shorted turns. As shown in FIG. 1, detector 14 includes a plurality of electronic components that may have reached the end of their life. Further, poor solder connections may have developed because of rough handling. The SCR 22 may short circuit. This failure mode may occur at end of life, or it may be caused by a voltage surge on the electrical distribution system from lightning. When SCR 22 is shorted, a continuous current flows through solenoid 24 causing it to burn open through over activation. Alternatively, SCR 22 may open circuit. Another set of failure modes occur when the mechanical components associated with trip mechanism 26 become immobilized from wear or corrosion. Also, the power supply, if provided, may fail to deliver power in accordance with the design, such that sensor 12, detector 14, SCR 22, or solenoid 24 are non-operative.

In any event, when device 10 fails, the time interval during which current flows through end of life indicator 406 is the duration that test button 82 is manually depressed, that is, the time interval is greatly increased. For example, when test contact 82 is manually depressed, indicator 406 may emit for a time period in excess of several seconds. Thus, the user is made aware of the failure of device 10 by the prolonged enablement of end of life indicator 406. It will be apparent to those of ordinary skill in the pertinent art that modifications and variations can be made to indicator 406 of the present invention. For example, indicator 406 may be a lamp, an LED, an annunciator, an acoustic device, an RF emitter, or any suitable component. For example, a visual indicator may be configured to illuminate a message that includes at least one word or a symbol. Indicator 406 can be included in device 10, or be disposed in a remote location relative to device 10.

Figure 2:
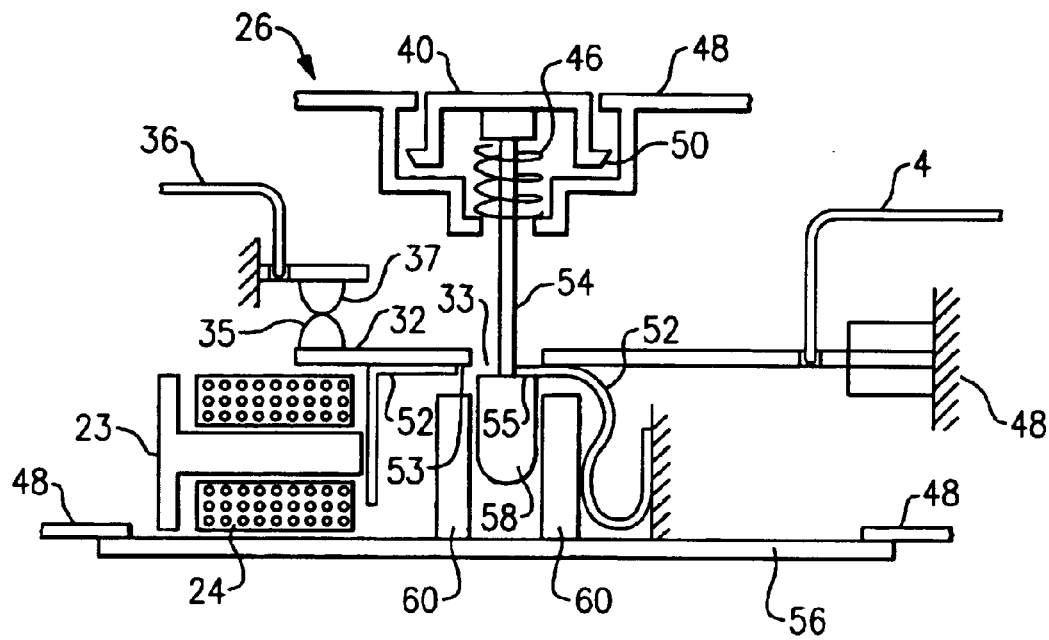
FIG. 2 is a partial sectional view of the mechanical implementation of the schematic depicted in FIG. 1.

Referring to FIG. 2, the mechanical layout for the circuit depicted in FIG. 1 is shown. In this Figure, trip mechanism 26 is shown in the set state, meaning that contacts 37 and 35 are closed. Contacts 35 and 37 are held closed by action of a trapped make-force spring 46. Spring 46 acts on escapement 55, on a reset stem 54, to lift a reset latch spring 52 and by interference, an armature 32. Reset latch spring 52 includes a hole 53. Armature 32 also includes a hole 33. Holes 33 and 53 permit entry of a tip 58 of reset stem 54. Reset stem 54 is held in place by a block 60. Armature 32 and a printed circuit board (PCB) 56 are mechanically referenced to a housing 48 so that the force in spring 46 is concentrated into armature 32. Electrical components associated with the circuit diagram of FIG. 1 may be disposed on circuit board (PCB) 56.

Figure 3:
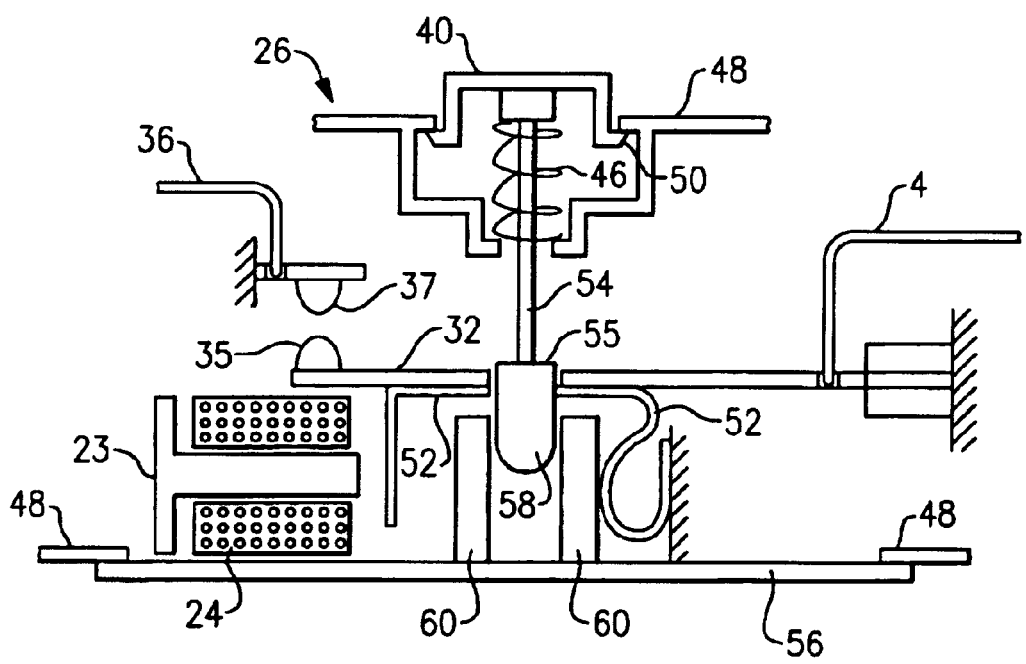
FIG. 3 shows the mechanical implementation of FIG. 1 in a tripped state.

Referring to FIG. 3, the mechanism of FIG. 2 is shown in the tripped state. The tripped state occurs when SCR 22 activates a magnetic field in solenoid 24, which in turn pulls in plunger 23 to displace reset latch spring 52. Displacing reset latch spring 52 allows a flat portion 55 to clear the latch spring 53 interference, which then releases the interference between latch spring 52 and armature 32. Armature 32 has a memory which returns armature 32 to a resting position against solenoid 24, opening contacts 35 and 37 and disconnecting power to the load. The principles shown in FIGS. 1–3 are adaptable to any number of mechanical configurations including U.S. Pat. No. 5,510,760 which is incorporated herein by reference.

Figure 4:
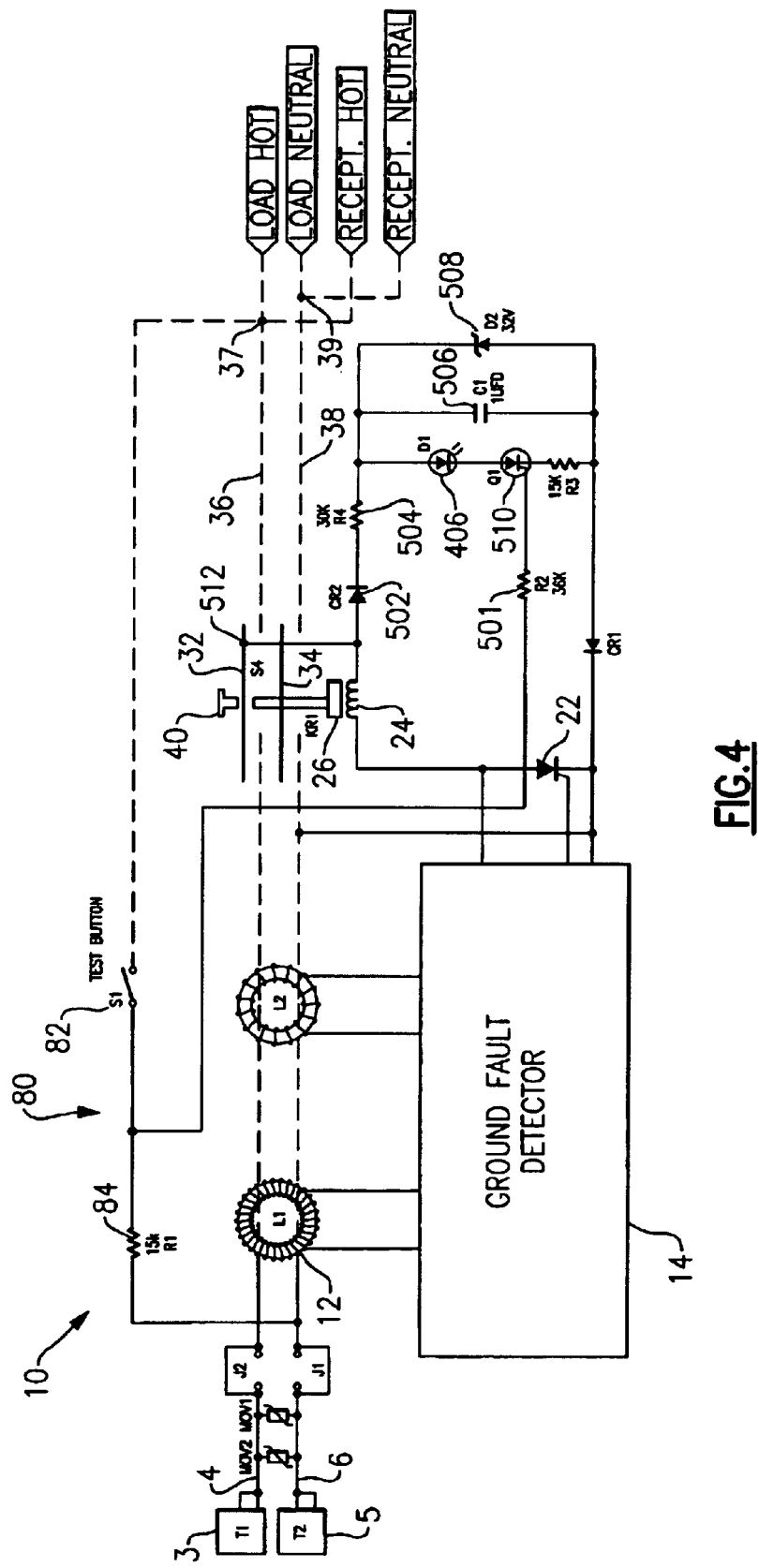
FIG. 4 is a schematic of a GFCI device according to a second embodiment of the present invention.

As embodied herein and depicted in FIG. 4, a schematic of a GFCI device 10 according to a second embodiment of the present invention is disclosed. In this embodiment, end-of-life indicator 406 is coupled to a node 512 on an armature 32 or load side conductor 36 (not shown.) Indicator 406 is in series with SCR 510. SCR 510 is coupled to a DC voltage source provided by diode 502, resistor 504, capacitor 506 and Zener 508. Resistor 501 is coupled to contact 82 and to the gate of SCR 510. When contact 82 is closed, a difference current flows through resistor 84 as described above, and a current flows through resistor 501. The current flowing through resistor 501 produces little, or preferably no, difference current between conductors 4 and 6. Thus, any additional current through resistor 501 does not disturb UL's test simulation signal. However, the current flowing through resistor 501 causes SCR 510 to conduct. When SCR 510 conducts, end-of-life indicator 406 is energized. Under normal conditions, end-of-life indicator 406 indicates for approximately 25 milliseconds, in the manner previously described. As noted above, this interval is very brief and unnoticeable to the user.

When device 10 fails, the current through end of life indicator 406 starts to flow when contact 82 is depressed. When contact 82 is released, the current through resistor 501 ceases, but SCR 510 remains latched in conduction. Thus, current continues to flow through end of life indicator 406, and therefore remains enabled until such time as SCR 510 is reset. Reset may be accomplished by depressing contact 82 at a later time, when device 10 is able to trip. For example, device 10 may trip when there is sufficient voltage, from the electrical distribution system, to enable trip mechanism 26 to operate. Similarly, the user may disable end-of-life indicator 406, or line terminals 3 and 5 may be momentarily decoupled from the line and neutral respectively, causing SCR 510 to unlatch. If device 10 has reached end of life, depressing contact 82 will re-enable SCR 510 and the indication from the end of life indicator 406. Thus SCR 510 serves as a re-settable latch. Upon device failure, SCR 510 enables end-of-life indication even after contact 82 has been manually released, until such time as a reset action has been executed.

Figure 5:
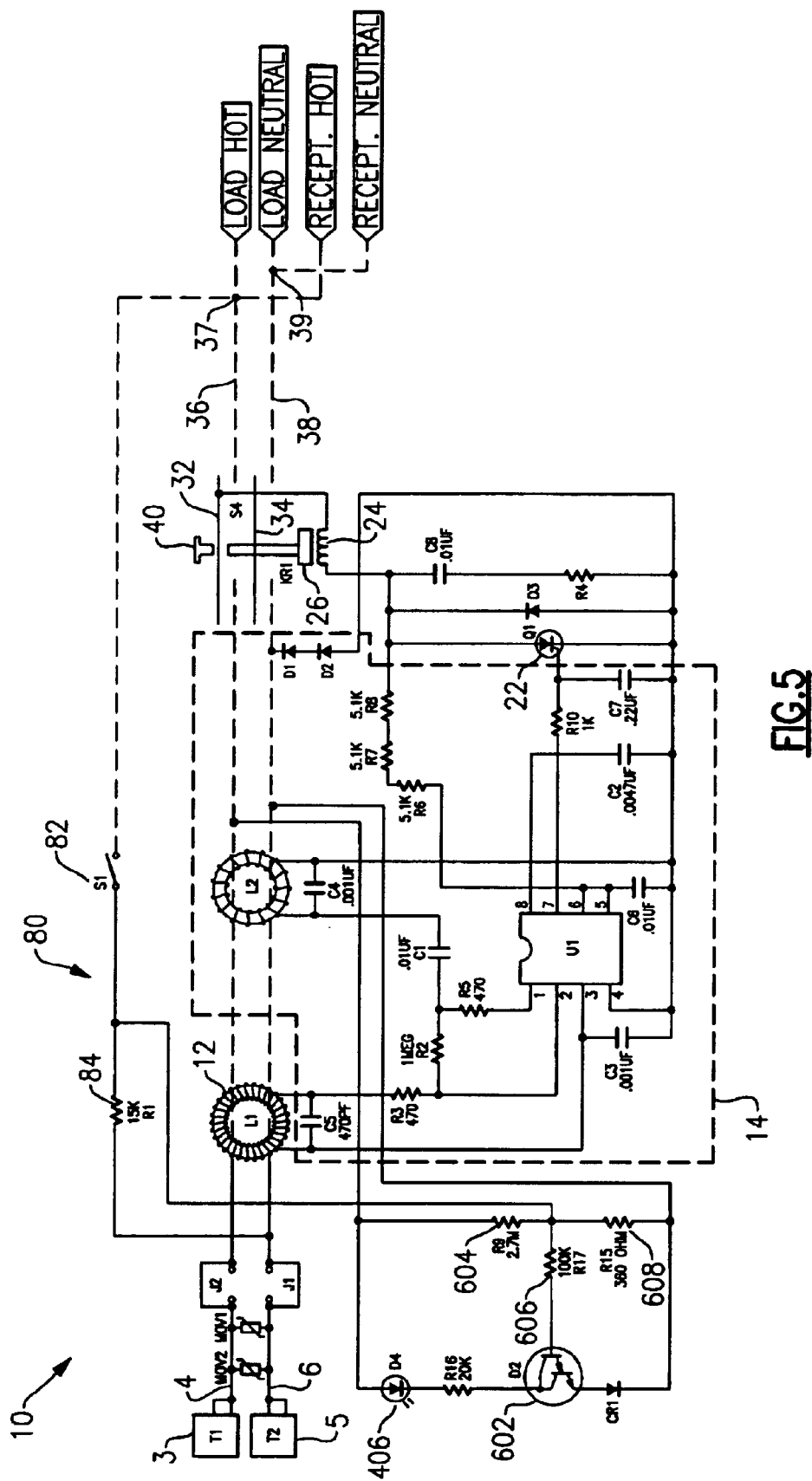
FIG. 5 is a schematic of a GFCI device according to a third embodiment of the present invention.

As embodied herein and depicted in FIG. 5, a schematic of a GFCI device 10 according to a third embodiment of the present invention is disclosed. In this embodiment, end-of-life indicator 406 is coupled to transistor 602. Resistor 606 couples contact 82 to the base of transistor 602. When contact 82 is closed, the test difference current is generated, as previously described. When contact 82 is closed, the current through resistor 606 and likewise resistors 604 and 608 produce little, or preferably no difference current between conductors 4 and 6. Thus, the current through resistor 606 does not disturb UL's test simulation signal requirements. On the other hand, current through resistor 606 causes transistor 602 to turn on, to thereby energize end-of-life indicator 406. Again, under normal conditions, end-of-life indicator 406 is energized for approximately 25 milliseconds, as previously described. The indication is thus brief and unnoticeable to the user.

When device 10 fails, the current through end of life indicator 406 starts to flow as before, when contact 82 is depressed. At the same time, current starts to flow through resistor 608, which typically has a low value on the order of 360 Ohms. As predicted by Ohm's law (I=V/R), the current flowing through resistor 608 is increased. The increased current causes electrical power ($I^2R$) to be dissipated as heat at resistor 608. Resistor 608 is configured to survive the increased current during the expected trip time (approximately 25 milliseconds). However, resistor 608 is also configured to open circuit when the trip time is delayed. In particular, resistor 608 opens when current flows through it for more than about one second. In the open circuit condition, resistor 604 keeps transistor 602 permanently on, and end-of-life indicator 406 is permanently enabled. Because the user cannot restore resistor 608 after it is open circuited, resistor 608 serves as a non-resettable latch. Thus, end-of-life indicator 406 is energized even after contact 82 is manually released without reset proviso. Although lock-out indication has been illustrated as an additional feature in FIG. 5, the feature can be employed in each of the other embodiments of the present invention.

The invention provides an indication of when the device's end-of-life has been reached. There may be a situation when end-of-life causes armatures 32 and 34 to permanently move to the open positions. In this case, the ability to reset device 10 using reset button 40 becomes disabled. Failure of a component that results in the inability to maintain contact closure is known as 'end of life lock out'. When failure of a component has caused lock-out, the user may not understand why electrical power to the load cannot be maintained or restored.

Figure 6:
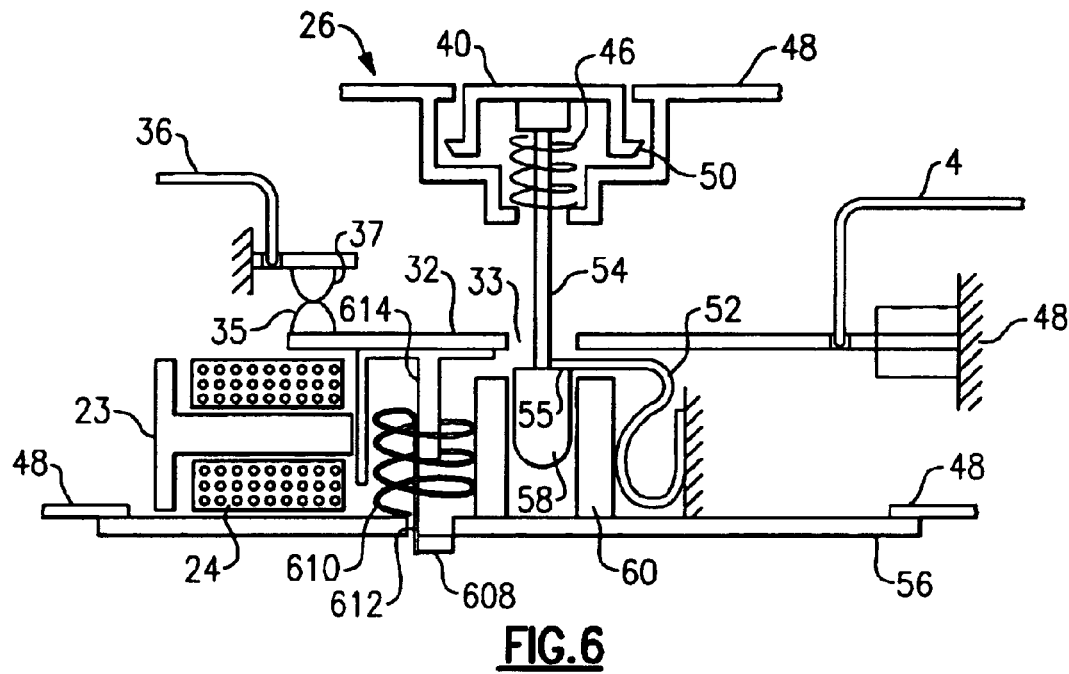
FIG. 6 shows a partial sectional view of a mechanical implementation of an embodiment of the invention.

For example, if SCR 22 shorts out, the attempt to close armatures 32 and 34 using reset button 40 causes a current to immediately flow through solenoid 24. This causes armatures 32 and 34 to immediately re-open. The end of life failure of SCR 22 does not result in a hazardous condition because the fault is not powered. However, it represents an 'end of life lock out' condition. As noted above, the user may not understand why electrical power to the load cannot be maintained or restored. The confusion can be alleviated by adding, for example, diode 610 to FIG. 5. When SCR 22 has reached end of life by shorting out, diode 610 causes indicator 406 to indicate. End of life indication informs the user as to why device 10 cannot be reset. To those skilled in the art, other component failures that result in lock-out can be configured to cause the end of life indicator to indicate. Referring to FIG. 6, a partial sectional view of a mechanical implementation of an embodiment of the invention showing another method of accomplishing end-of-life lock-out. A resistor 608, shown schematically in FIG. 5, is designed to withstand self-heating that results from each depression of contact 82, which causes current to flow through resistor 608 for the expected trip time of the GFCI. In particular, resistor 608 must survive several thousand trip time intervals accomplished by depressing contact 82 and reset button 40 alternately. During normal operation of GFCI 10, resistor 608 is physically positioned to restrain lockout spring 610. Resistor 608 is preferably mounted and soldered so that the body of resistor 608 impedes movement of lockout spring 610.

Figure 7:
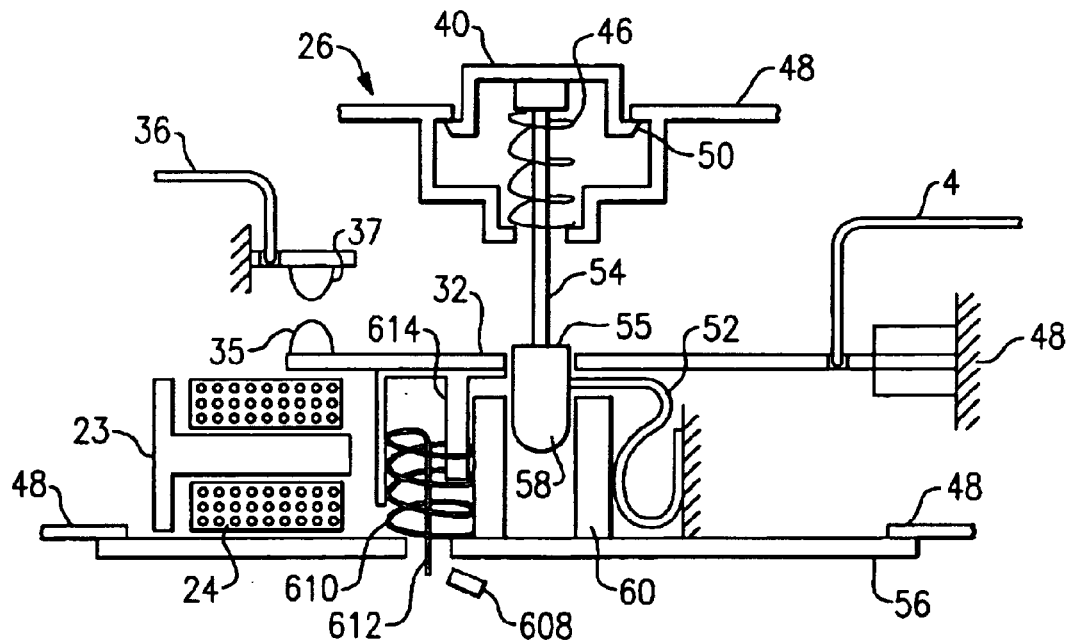
FIG. 7 shows a partial sectional view of the mechanical implementation of FIG. 4 is shown in the lock-out position.

Referring to FIG. 7, a partial sectional view of the mechanical implementation of FIG. 6 is shown in the lock-out position. The GFCI 10 has failed in some manner such that the trip time in response to depressing contact 82 is greater than the expected interval including failure of GFCI 10 to trip altogether. Examples of failure modes include a defective sensor, and for a sensor comprising a transformer, open or shorted turns. The detector 14, typically composed of electronic components, may have poor solder connections or components that have reached end of life. The SCR 22 may short circuit either due to reaching end of life or due to a voltage surge from a lightning storm, thereby causing continuous current through solenoid 24 which burns open through over activation, or, alternatively, SCR 22 may open circuit. The mechanical components associated with trip mechanism may become immobilized from wear or corrosion. A power supply, if provided, may fail to deliver power in accordance with the design such that sensor 12, detector 14, SCR 22, or solenoid 24 are non-operative. When failure of GFCI 10 occurs, the current through resistor 608 flows for the time that contact 82 is manually depressed, on the order of at least seconds, which is two orders of magnitude longer than if the trip mechanism 26 were to operate in response to depressing contact 82. Resistor 608, which is preferably coupled electrically to GFCI 10 through solder, heats from the current and melts the solder. Resistor 608, no longer restrained by the solder, or in an alternative embodiment by an adhesive, is physically dislodged by the bias of lockout spring 610. Force is then applied by an end 612 of lock-out spring 610 against a feature on the reset latch spring 52, for example, a tab 614. The force in lockout spring 610 is greater than the force in reset latch spring 52. As previously described, reset latch spring 52 is displaced allowing a flat portion 55 to clear the latch spring 53 interference, which then releases the interference between reset latch spring 52 and armature 32. Armature 32 has a memory which returns armature 32 to a resting position against solenoid 24, opening contacts 35 and 37 and disconnecting power to the load. Thus when the GFCI 10 is operational, the tripping mechanism 26 is able to operate, and the armatures 32 and 34 disconnect when plunger 23 applies force to reset latch spring 52. If GFCI 10 is not operative, lockout spring 610 applies force to reset latch spring 52, likewise causing armatures 32 and 34 to disconnect. When GFCI 10 is tripped under the influence of lockout spring 610, armatures 32 and 34 are permanently disconnected irrespective of depressing contact 82 or reset button 40 or any further movement in plunger 23. Thus resistor 608 is integral to the lock-out feature and to activation of the end-of-life indicator. Stated generally, if GFCI 10 has reached end-of-life, in response to manual closure of a set of switch contacts there is activation of an end-of-life indicia and activation of an end-of-life lock-out.

Figure 8:
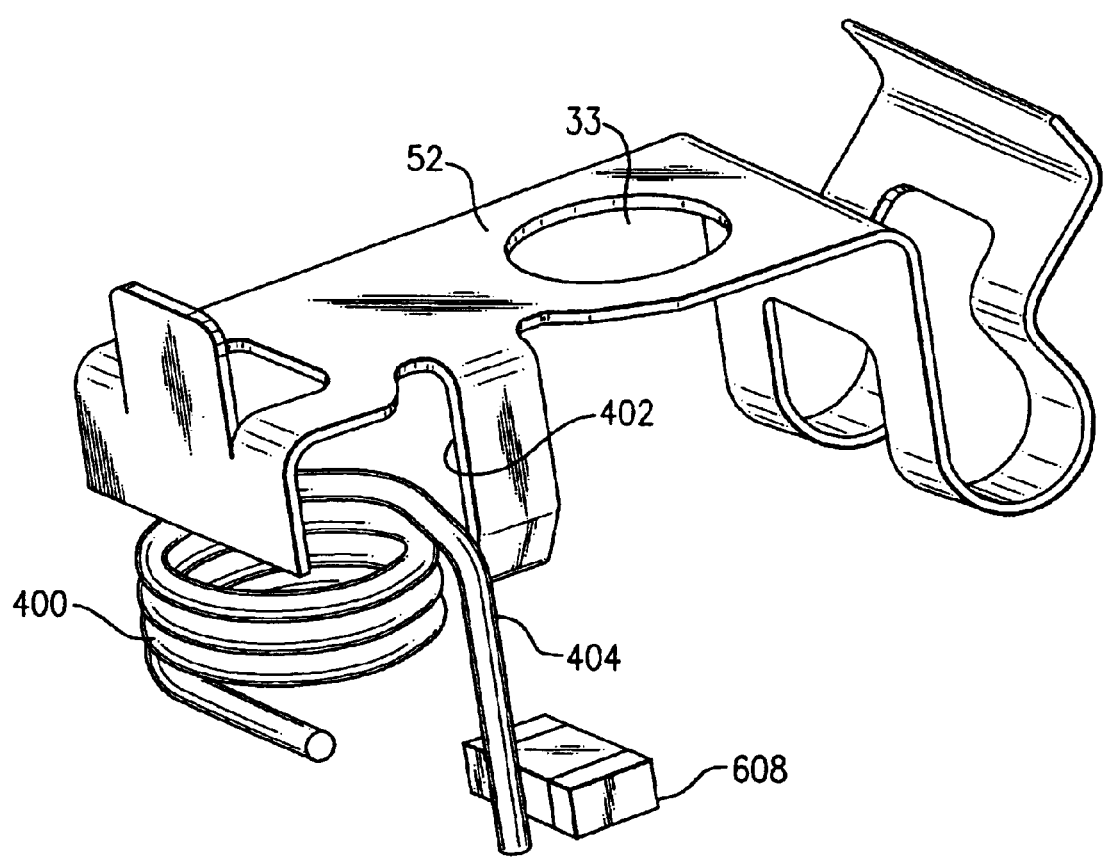
FIG. 8 shows a three-dimensional view of some of the components of the embodiment of FIG. 4.

Referring to FIG. 8, components of the embodiment of FIG. 6 are shown in a three-dimensional view including lockout spring 610, end 612, resistor 608, and latch spring 52. Spring 610 is preferably affixed to the same structure as resistor 608.

Figure 9:
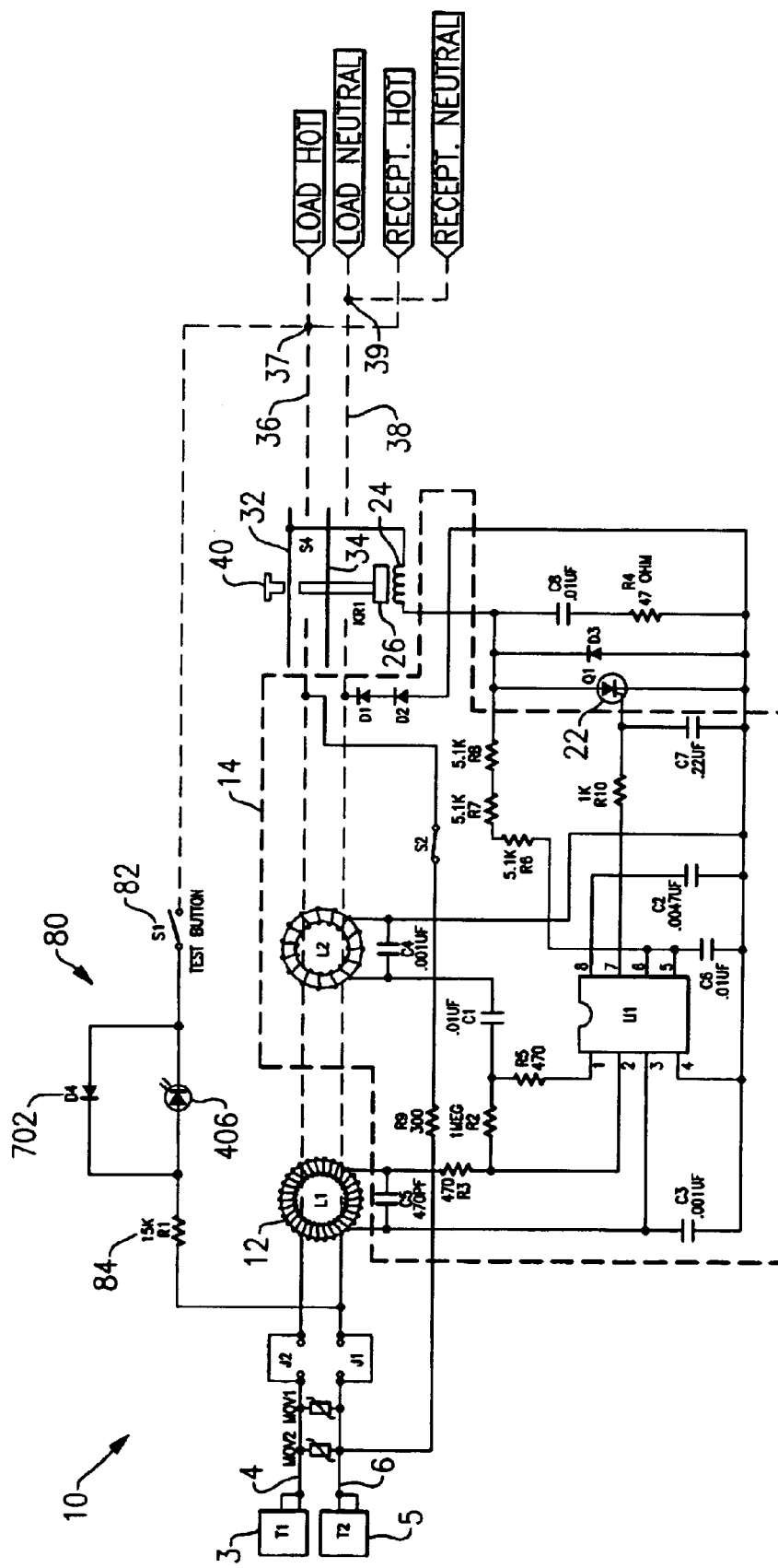
FIG. 9 is a schematic of a GFCI device according to a fourth embodiment of the present invention.

As embodied herein and depicted in FIG. 9, a schematic of a GFCI device 10 according to a fourth embodiment of the present invention is disclosed. In this embodiment, end-of-life indicator 406 is in series with resistor 84 which is coupled to contact 82. The voltage drop of the end-of-life indicator 406 is configured to be less than approximately 10 Volts. Since the current through resistor 84 is typically derived from at least a 120 VAC source, the voltage drop has less than a 10% effect on the current through resistor 84. Thus, the UL requirement for the amount of simulation current are met. Diode 702 can be included in order to achieve a low voltage drop, or to protect end-of-life indicator 406 when the voltage from the electrical power distribution system has a reverse biasing polarity.

Figure 10:
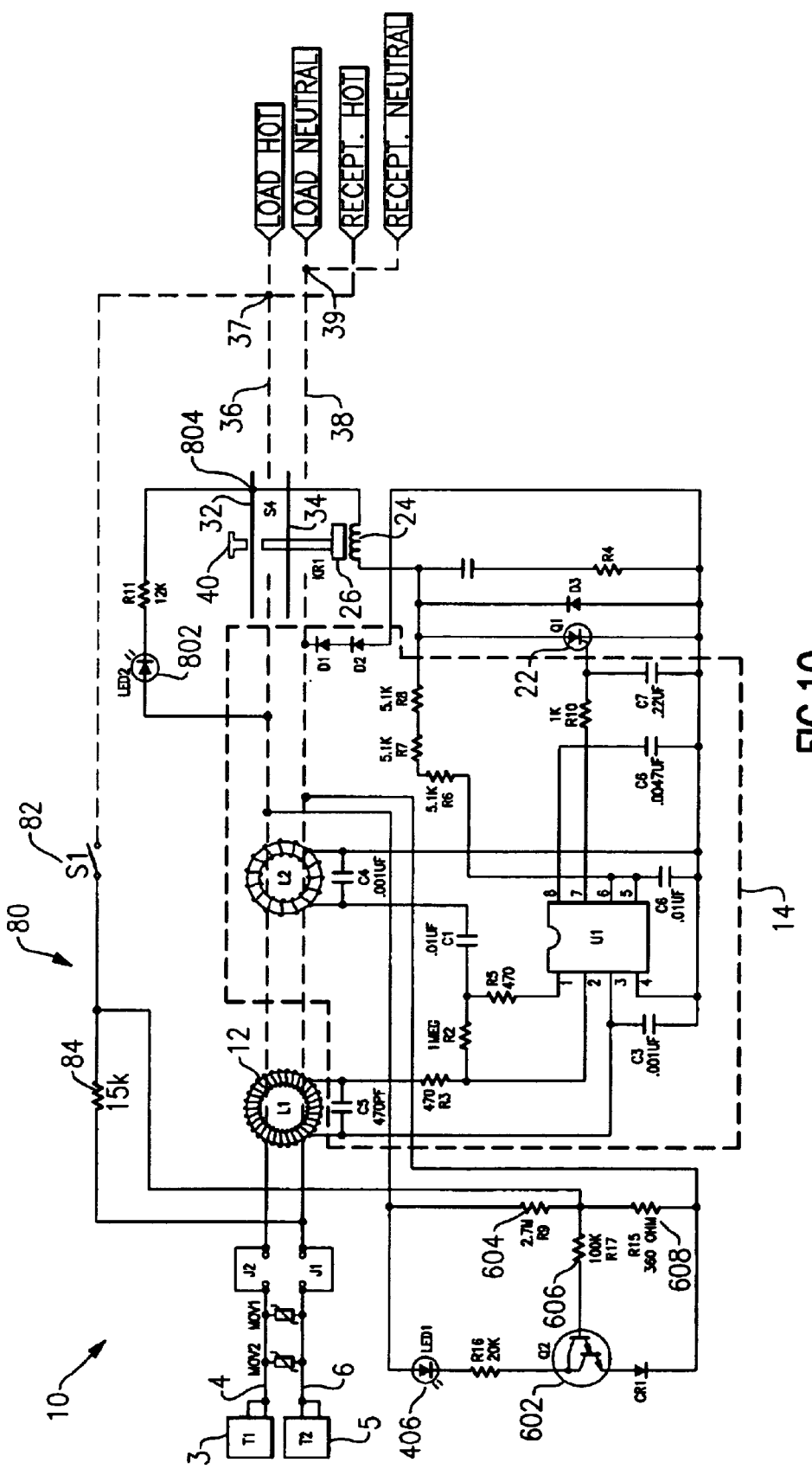
FIG. 10 is a schematic of a GFCI device according to a fifth embodiment of the present invention.

As embodied herein and depicted in FIG. 10, a schematic of a GFCI device 10 according to a fifth embodiment of the present invention is disclosed. In this embodiment, device 10 includes a locator component 802, which is also known as a trip indicator. Trip indicator 802 is coupled to node 804 on armature 32. There is current through trip indicator 802 only when armature 32 is not closed. The purpose of trip indicator 802 is to indicate when device 800 is tripped. This feature is designed to help the user locate the origin of power loss in the load side. End of life indicator 604 continues to operate in the manner previously described.

Figure 11:
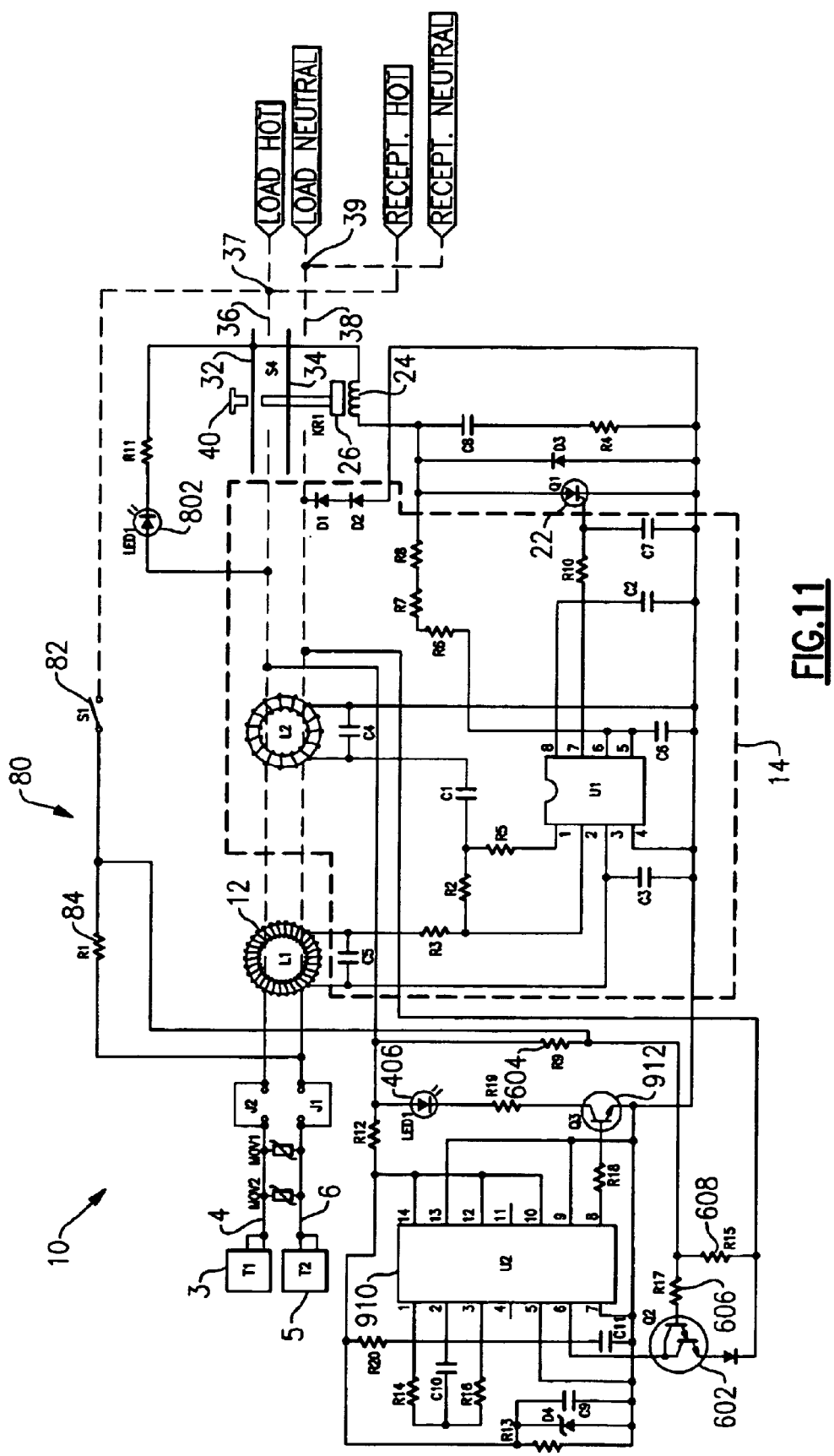
FIG. 11 is a schematic of a GFCI device according to a sixth embodiment of the present invention.

As embodied herein and depicted in FIG. 11, a schematic of a GFCI device 10 according to a sixth embodiment of the present invention is disclosed. In this embodiment, additional components have been added to end of life indicator 406, to produce a flashing light if visual end of life indication is utilized, or beeping if audible end of life indication is utilized. The flashing circuit has been combined with the non-resettable latching indicator depicted in FIG. 5. However, those of ordinary skill in the art will recognize that the flashing indicator circuit of the sixth embodiment may be employed with any of the embodiments disclosed herein. Referring to FIG. 11, when transistor 602 turns on due to device 10 failure, as described previously, recycling timer 910 is enabled. Timer 910 is configured to turn transistor 912 on and off in a repeating pattern. This pattern causes end-of-life indicator 406 to flash or beep in the event of an end-of-life failure. Recycling timer 910 may be of any suitable type, for example, timer 910 may be a Motorola 14541 integrated circuit as shown. However, any number of circuit configurations familiar to those skilled in the art that cause transistor 912 to repeatably turn on and off may be employed. Thus, end of life indication, and other types of indications can be differentiated thereby. To further help the user distinguish between trip indication and end of life indication, indicators 802 and 406 may be of different colors, or may be configured to illuminate different messages that include at least one word, or various symbols. The other indication can be, but is not limited to trip indication, as described in previous paragraphs.

Figure 12:
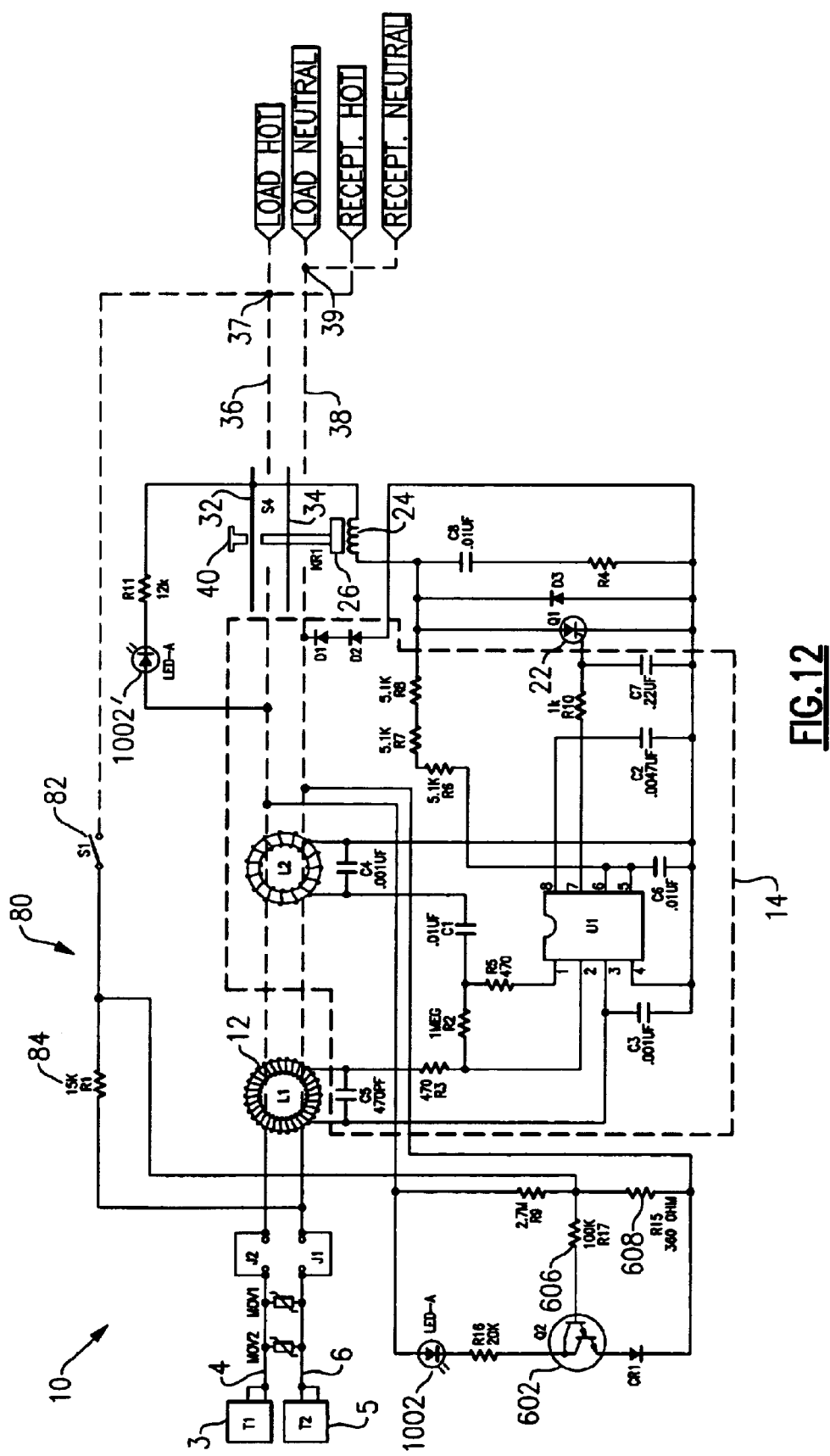
FIG. 12 shows an alternate embodiment of the device depicted in FIG. 8.

Referring to FIG. 12, an alternate indicator to FIG. 11 is shown. In particular, a single lamp housing having two indication elements 1002 and 1002' are employed. These indication elements may be employed to signal end of life, a trip condition, or other messages. Elements 1002 and 1002' may have a common terminal. The advantage of a single lamp housing is to conserve space with respect to the enclosure of device 10.

Figure 13:
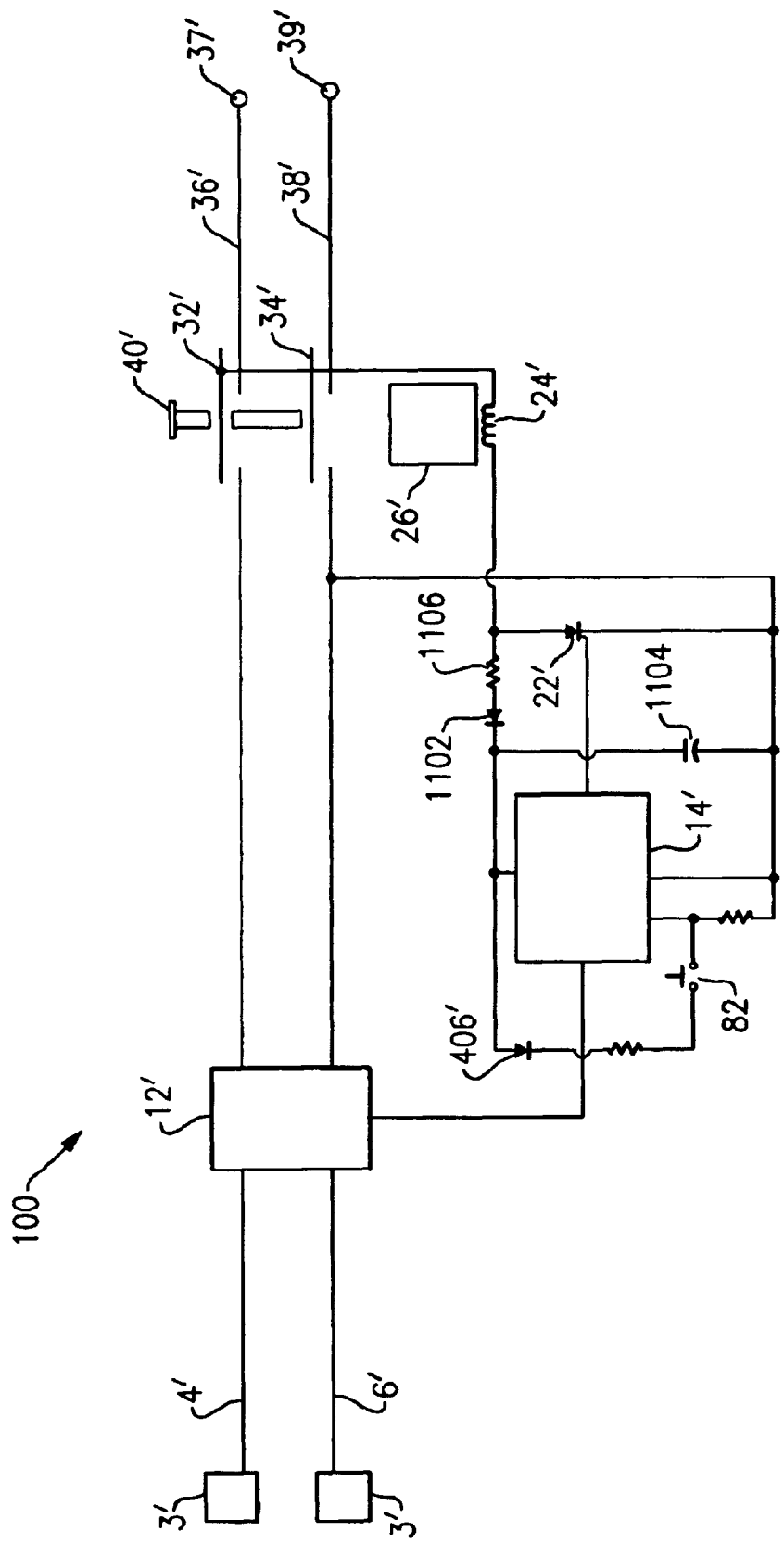
FIG. 13 is a protective device according to a seventh embodiment of the present invention.

As embodied herein and depicted in FIG. 13, a protective device 100 according to yet another embodiment is shown. GFCIs have been described in the preceding embodiments, but the present invention also applies to devices that are intended to detect and interrupt differential currents as high as 500 mA, for single phase or multi-phase electrical distribution systems. The invention equally applies to other protective devices such as AFCIs intended for fire prevention. Reference is made to U.S. Pat. No. 6,421,214, which is incorporated herein by reference as though fully set forth in its entirety, for a more detailed explanation of such protective devices. In this embodiment, contact 82 is manually operated by a test button, but the test signal components are not necessarily connected directly to conductors 4 and 6. Further, the test signal does not necessarily produce a differential current between conductors 4 and 6, but like the preceding embodiments is designed to test the operative condition of one or more device components. For example, sensor 12' senses an abnormal current in conductors 4' or 6'. Abnormal voltage between conductors 4' and 6' is detected by detector 14'. Detector 14' is connected to a power supply that includes diode 1102, resistor 1106, and capacitor 1104. When a fault condition is detected by detector 14' that is greater than a predetermined threshold, SCR 22' enables solenoid 24' to trip the interrupting mechanism 26'. Armatures 32' and 34' disconnect the line terminals 3' and 5' from respective load terminals 37' and 39'. Device 100 also includes a test button that operates contact 82, to thereby create a test signal that tests one or more components of the protective device. For example, components such as sensor 12', detector 14', the power supply voltage on capacitor 1104, SCR 22', solenoid 24' or interrupting mechanism 26' may be tested individually, or in combination with other components. If contact 10' is manually closed and the protective device 100 fails to trip within the expected trip time duration, end of life indicator 406' provides a noticeable indication to the user. The indication method of FIG. 1 has been used by way of illustration, but those of ordinary skill in the art will recognize that the various embodiments described herein are equally adaptable to the protective device 100.

Figure 14:
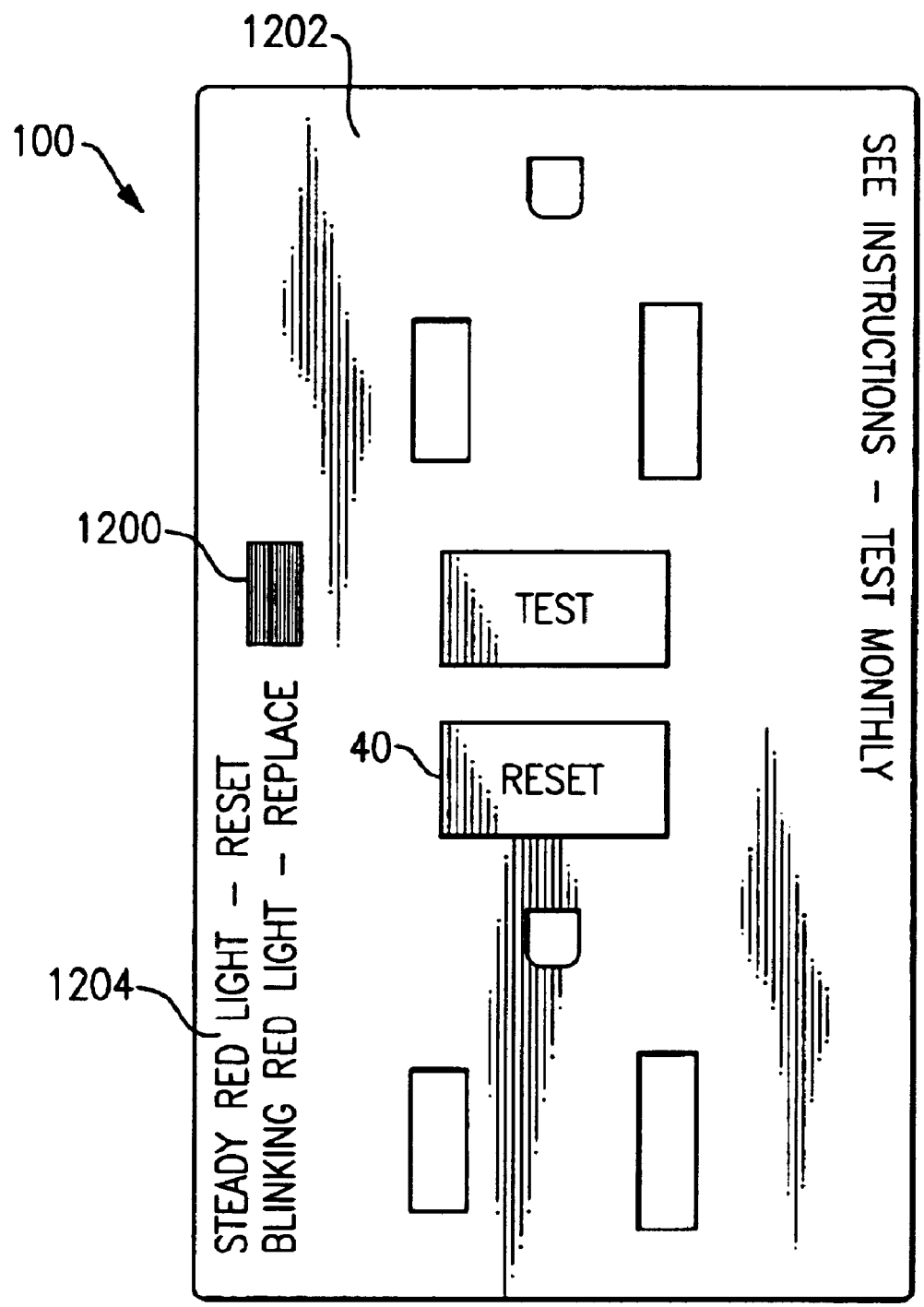
FIG. 14 shows a partial sectional view of the housing of yet another embodiment of the present invention.

Referring to FIG. 14, a cover 1202 for the housing of the protective device 100 is shown. End-of-life indicator 406' is configured to align with a viewing window 1200, provided in cover portion 1202. Viewing window 1200 may be an aperture, a clear molded lens, or a thin, translucent section of the front cover 1202. In any case, aperture 1200 is configured to facilitate the emission of sound or light. Instructions such as shown generally as 1204 may be placed in proximity of window 1200 to aid the user with interpreting the enablement of life indicator 406'. Device 100 is shown as a receptacle, but those of ordinary skill in the art will recognize that any wiring device may be employed, including a circuit breaker, and portable and module housings.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A protective device including a plurality of line terminals configured to be connected to an electrical distribution system and a plurality of load terminals configured to be connected to a load, comprising:
    a fault detection circuit coupled to the plurality of line terminals and the plurality of load terminals, the fault detection circuit being configured to detect at least one fault in the electrical distribution system;
    a power interruption circuit coupling the plurality of line terminals to the plurality of load terminals to thereby provide power to the load under normal operating conditions, the power interruption circuit also being coupled to the fault detection circuit and configured to decouple the plurality of line terminals from the plurality of load terminals in response to the fault detection circuit detecting the at least one fault; and
    a test circuit coupled to the fault detection circuit and the power interruption circuit, the test circuit being configured to provide a simulated fault signal to the fault detection circuit in response to a user stimulus, the test circuit including an end-of-life alarm indicator, the end-of-life alarm indicator being configured to provide an end-of-life alarm if the fault detection circuit and/or power interruption circuit fails to respond to the simulated fault signal within a predetermined period of time.

2. The device of claim 1, wherein the fault detection circuit is configured to detect a ground fault condition.

3. The device of claim 1, wherein the fault detection circuit is configured to detect an arc fault condition.

4. The device of claim 1, wherein the protective device is configured as a receptacle.

5. The device of claim 1, wherein the protective device is configured as a switch.

6. The device of claim 1, wherein the protective device is disposed in a circuit breaker.

7. The device of claim 1, wherein the protective device is disposed in a module or portable housing.

8. The device of claim 1, wherein the end-of-life alarm indicator includes a visual alarm indication.

9. The device of claim 8, wherein the visual alarm indicator includes at least one light emitting diode.

10. The device of claim 9, wherein the at least one light emitting diodes includes a plurality of light emitting diodes configured to provide a plurality of indications.

11. The device of claim 10, wherein the plurality of indicators includes a trip indicator.

12. The device of claim 10, wherein the plurality of indicators includes a pilot light.

13. The device of claim 10, wherein the plurality of indicators includes a locator light.

14. The device of claim 8, wherein the visual alarm indicator includes human readable indicia.

15. The device of claim 8, wherein the visual alarm indicator includes a lamp display.

16. The device of claim 8, wherein the visual alarm indicator provides a periodic flashing light to indicate end-of-life.

17. The device of claim 16, wherein the visual alarm indicator provides a continuous non-flashing light to indicate a condition other than end-of-life indication.

18. The device of claim 1, wherein the end-of-life alarm indicator includes an audible alarm indicator.

19. The device of claim 18, wherein the audible alarm indicator provides a periodic sound to indicate the end-of-life condition.

20. The device of claim 1, wherein the end-of-life alarm indicator includes an RF alarm indication signal.

21. The device of claim 20, wherein the RF alarm indication signal is interpreted by a remote facility.

22. The device of claim 20, wherein the RF alarm indication signal is adapted to a wireless communications format.

23. The device of claim 1, wherein the end-of-life alarm indicator is transmitted by a wireline facility.

24. The device of claim 1, wherein the fault detection circuit further comprises:
   a sensor coupled to at least one line terminal and/or load terminal among the plurality of line terminals and/or the plurality of load terminals, the sensor being configured to sense the at least one fault and provide a fault sensing signal; and
   a detector coupled to the sensor, the detector being configured to interpret the fault sensing signal and detect the at least one fault.

25. The device of claim 1, wherein the power interruption circuit further comprises:
   a switch mechanism coupled to the fault detection circuit, the switch mechanism being actuated in response to the fault detection circuit detecting the at least one fault; and
   a trip mechanism coupled to the switch mechanism, the trip mechanism being configured to decouple the plurality of line terminals from the plurality of load terminals in response to a signal from the switch mechanism.

26. The device of claim 25, wherein the switch mechanism includes a solenoid.

27. The device of claim 25, wherein the trip mechanism includes interrupting contacts configured to decouple the plurality of line terminals from the plurality of load terminals.

28. The device of claim 1, wherein the user stimulus generates an electrical signal.

29. The device of claim 1, wherein the user stimulus generates an optical signal.

30. The device of claim 1, wherein the user stimulus generates a wireless signal.

31. The device of claim 1, wherein the test circuit includes a test button and a contact, the test button being depressed by the user stimulus to thereby close the contact and generate the simulated fault signal.

32. The device of claim 1, further comprising an end-of-life indication circuit coupled to the test circuit, the end-of-life alarm indicator, and the power interruption circuit, the end-of-life indication circuit activating the end-of-life alarm if the fault detection circuit and/or power interruption circuit fails to respond to the simulated fault signal within a predetermined period of time.

33. The device of claim 32, further comprising a resettable latch configured to be latched by the simulated fault signal and unlatched by the power interruption circuit, the end-of-life indication circuit activating the end-of-life alarm if the fault detection circuit fails to actuate the power interruption circuit in response to the simulated fault signal within a predetermined period of time.

34. The device of claim 33, wherein the resettable latch is reset by a removal and a restoration of a source of voltage.

35. The device of claim 32, further comprising a non-resettable latch configured to be latched by the simulated fault signal to thereby enable the end-of-life indication circuit to provide the end-of-life alarm, the non-resettable latch permanently enabling the end-of-life indication circuit if the fault detection circuit fails to actuate the power interruption circuit in response to the simulated fault signal within a predetermined time interval.

36. The device of claim 32, wherein the test circuit includes a test button and a contact, the test button being depressed by the user stimulus to thereby close the contact and generate the simulated fault signal.

37. The device of claim 36, wherein the closing of the contact generates the simulated fault signal and an end-of-life alarm signal to enable the end-of-life indication circuit.

38. The device of claim 37, further comprising a resettable latch configured to receive the end-of-life alarm signal and enable the end-of-life indication circuit in response thereto.

39. The device of claim 37, further comprising a non-resettable latch configured to receive the end-of-life alarm signal and enable the end-of-life indication circuit in response thereto.

40. The device of claim 32, wherein the end-of-life indication circuit provides the user with an end-of-life indication for the duration of the user stimulus of the test circuit.

41. The device of claim 32, wherein the at least one failure of the fault detection circuit or power interruption circuit prevents the plurality of line terminals from being coupled to the plurality of load terminals.

42. A protective device including a plurality of line terminals configured to be connected to an electrical distribution system and a plurality of load terminals configured to be connected to a load, comprising:
   a fault detection circuit coupled to the plurality of line terminals and the plurality of load terminals, the fault detection circuit being configured to detect at least one fault in the electrical distribution system;
   a power interruption circuit coupling the plurality of line terminals to the plurality of load terminals to thereby provide power to the load under normal operating conditions, the power interruption circuit also being coupled to the fault detection circuit and configured to decouple the plurality of line terminals from the plurality of load terminals in response to the fault detection circuit detecting the at least one fault;
   a test circuit coupled to the fault detection circuit and the power interruption circuit, the test circuit being configured to provide a simulated fault signal to the fault detection circuit in response to a user stimulus;
   a resettable latch configured to be latched by the simulated fault signal from the test circuit and unlatched by the decoupling of the plurality of the line terminals from the plurality of load terminals by the power interruption circuit; and
   an end-of-life indication circuit coupled to the resettable latch, the end-of-life indication circuit providing the user with an end-of-life alarm indication if the resettable latch does not unlatch within a predetermined period of time.

43. A protective device including a plurality of line terminals configured to be connected to an electrical distribution system and a plurality of load terminals configured to be connected to a load, comprising:
   a fault detection circuit coupled to the plurality of line terminals and the plurality of load terminals, the fault detection circuit being configured to detect at least one fault in the electrical distribution system;
   a power interruption circuit coupling the plurality of line terminals to the plurality of load terminals to thereby provide power to the load under normal operating conditions, the power interruption circuit also being coupled to the fault detection circuit and configured to decouple the plurality of line terminals from the plurality of load terminals in response to the fault detection circuit detecting the at least one fault;

a test circuit coupled to the fault detection circuit and the power interruption circuit, the test circuit being configured to provide a simulated fault signal to the fault detection circuit in response to a user stimulus;

a non-resettable latch configured to be permanently latched if the duration of the simulated fault signal from the test circuit is greater than a predetermined amount of time; and an end-of-life indication circuit coupled to the non-resettable latch, the end-of-life indication circuit providing the user with a permanent end-of-life alarm indication after the non-resettable latch has been latched.

44. A protective device including a plurality of line terminals configured to be connected to an electrical distribution system and a plurality of load terminals configured to be connected to a load, comprising:

a fault detection circuit coupled to the plurality of line terminals and the plurality of load terminals, the fault detection circuit being configured to detect at least one fault condition;

a power interruption circuit coupled to the fault detection circuit, configured to decouple the plurality of line terminals from the plurality of load terminals in response to the fault detection circuit detecting the at least one fault condition;

a test circuit coupled to the fault detection circuit and the power interruption circuit, the test circuit being configured to provide a simulated fault signal to the fault detection circuit in response to a user stimulus, the test circuit being configured to switch from an unlocked state to a lock-out state if the fault detection circuit fails to respond to the simulated fault signal within a predetermined period of time, the power interruption circuit being disabled from re-coupling the plurality of line terminals to the plurality of load terminals in the lock-out state; and an end-of-life indication circuit coupled to the test circuit and the power interruption circuit, the end-of-life indication circuit providing the user with an end-of-life alarm indication in the lock-out state.

* * * * *

UNITED STATES PATENT AND TRADEMARK OFFICE
CERTIFICATE OF CORRECTION

PATENT NO. : 6,952,150 B2  
APPLICATION NO. : 10/729396  
DATED : October 4, 2005  
INVENTOR(S) : Radosavljevic et al.

Page 1 of 1

It is certified that error appears in the above-identified patent and that said Letters Patent is hereby corrected as shown below:

On the Title Page

Item 75

Please add the following inventors

David A. Finlay, Sr.
Gary O. Wilson

Signed and Sealed this

Twentieth Day of May, 2008

JON W. DUDAS
*Director of the United States Patent and Trademark Office*